(12) United States Patent
Zhao et al.

(10) Patent No.: US 11,291,037 B2
(45) Date of Patent: Mar. 29, 2022

(54) SR/BSR TRIGGERING METHOD AND DEVICE

(71) Applicant: CHINA ACADEMY OF TELECOMMUNICATIONS TECHNOLOGY, Beijing (CN)

(72) Inventors: Yali Zhao, Beijing (CN); Fangli Xu, Beijing (CN); Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/475,674

(22) PCT Filed: Feb. 14, 2018

(86) PCT No.: PCT/CN2018/076818
§ 371 (c)(1),
(2) Date: Jul. 2, 2019

(87) PCT Pub. No.: WO2018/127247
PCT Pub. Date: Jul. 12, 2018

(65) Prior Publication Data
US 2020/0084796 A1  Mar. 12, 2020

(30) Foreign Application Priority Data

Jan. 4, 2017 (CN) .......................... 20170004262.9
Mar. 13, 2017 (CN) ......................... 201710145548.9

(51) Int. Cl.
*H04W 72/14* (2009.01)
*H04W 72/12* (2009.01)

(52) U.S. Cl.
CPC ....... *H04W 72/14* (2013.01); *H04W 72/1236* (2013.01)

(58) Field of Classification Search
CPC ............. H04W 72/14; H04W 72/1236; H04W 72/1284; H04L 27/2602; H04L 5/0064; H04L 5/0044
See application file for complete search history.

(56) References Cited

U.S. PATENT DOCUMENTS

| | | | |
|---|---|---|---|
| 10,945,178 B2 * | 3/2021 | Spapis | H04W 36/14 |
| 2005/0233752 A1 * | 10/2005 | Laroia | H04L 5/0007 455/450 |

(Continued)

FOREIGN PATENT DOCUMENTS

| | | |
|---|---|---|
| CN | 101686490 A | 3/2010 |
| CN | 101778418 A | 7/2010 |

(Continued)

OTHER PUBLICATIONS

International Search Report for PCT/CN2018/076818 dated May 7, 2018 and its English translation provided by WIPO.

(Continued)

*Primary Examiner* — Christine Ng
(74) *Attorney, Agent, or Firm* — Ladas & Parry, LLP

(57) ABSTRACT

An SR/BSR triggering method and device are provided by the present disclosure. The method includes triggering an SR (Scheduling Request) and/or BSR (Buffer Status Report) process, if there is uplink data transmission requirement in a bearer channel and/or logical channel of a terminal, and there is no uplink resource available to the terminal on physical resources corresponding to numerologies and/or TTI lengths available to the bearer channel and/or the logical channel.

20 Claims, 2 Drawing Sheets

---

101

Triggering an SR and/or BSR process, if there is uplink data transmission requirement in a bearer channel and/or logical channel of the terminal, and there is no uplink resource available to the terminal on physical resources corresponding to numerologies and/or TTI lengths available to the bearer channel and/or the logical channel

(56) References Cited

U.S. PATENT DOCUMENTS

| | | |
|---|---|---|
| 2010/0074231 A1 | 3/2010 | Hsu |
| 2011/0255492 A1* | 10/2011 | Dai ................... H04W 72/1284 370/329 |
| 2013/0188612 A1* | 7/2013 | Dinan ............... H04W 72/0486 370/336 |
| 2015/0230234 A1* | 8/2015 | Choi .................... H04B 7/0417 370/329 |
| 2016/0119969 A1* | 4/2016 | Vajapeyam ........... H04W 24/10 370/329 |
| 2016/0270114 A1 | 9/2016 | Dinan |
| 2017/0325255 A1* | 11/2017 | Xu .......................... H04L 43/00 |
| 2018/0020473 A1 | 1/2018 | Suzuki et al. |
| 2018/0139770 A1* | 5/2018 | Ozturk .............. H04W 28/0278 |
| 2018/0176909 A1* | 6/2018 | Wikstrom ......... H04W 72/0446 |
| 2019/0007993 A1* | 1/2019 | Bergquist ............. H04W 76/27 |
| 2019/0268930 A1* | 8/2019 | Rudolf ................. H04W 72/14 |

FOREIGN PATENT DOCUMENTS

| | | |
|---|---|---|
| CN | 102325380 A | 1/2012 |
| WO | 2016121800 A1 | 8/2016 |
| WO | 2016144893 A1 | 9/2016 |
| WO | 2016182344 A1 | 11/2016 |

OTHER PUBLICATIONS

Written Opinion of the Interational Search Authority for PCT/CN2018/076818 dated May 7, 2018 and its English translation provided by WIPO.

International Preliminary Report on Patentability of the International Search Authority for PCT/CN2018/076818 dated Jul. 9, 2019 and its English translation provided by WIPO.

First office action and search report for Chinese patent application 201710145548.9 dated Dec. 19, 2018 and its English translation provided by SIPO.

"Discussion on Buffer Status Reporting Procedure" 3GPP TSG-RAN WG2 #61R2-081084 Feb. 11-15, 2008 Sorrento, Italy LG Electronics Inc.

"MAC with multiple numerologies/multiple TTI lengths" 3GPP TSG-RAN WG2 Meeting #96 Reno, USA, Nov. 14-18, 2016 R2-168012 Nokia, Alcatei-Lucent Shanghai Bell.

* cited by examiner

SR/BSR TRIGGERING METHOD AND DEVICE

CROSS-REFERENCE TO RELATED APPLICATIONS

The present application is the US. national phase of PCT Application No. PCT/CN2018/076818 filed on Feb. 14, 2018 which claims priorities from Chinese Patent Application No. 201710004262.9 filed in China on Jan. 4, 2017, and Chinese Patent Application No. 201710145548.9 filed in China on Mar. 13, 2017, the entire contents of which are incorporated herein by reference.

TECHNICAL FIELD

The present disclosure relates to the technical field of communications, and in particular, to an SR (Scheduling Request)/BSR (Buffer Status Report) triggering method and device.

BACKGROUND

1) Introduction to SR and/or BSR Mechanisms

LTE (Long Term Evolution)/LTE-A (the abbreviation of LTE-Advanced, which is a subsequent evolution of the LTE technology) is a scheduling-based communication system, that is, if there is data in the transmission buffer of UE (User Equipment) that needs to be transmitted, then the UE has to first send a BSR to the base station to inform the base station of information of the data in the current transmission buffer of the UE that needs to be transmitted. After receiving the BSR sent by the UE, the base station allocates a corresponding UL-SCH (Uplink Shared Channel) resource to the UE according to the quantity of data to be transmitted by the UE and the service type, and notifies the UE to transmit data on the allocated UL-SCH resource.

The uplink shared channel (UL-SCH) resource is also required for the UE to transmit the BSR to the base station. If there is a BSR that needs to be reported, but there is no uplink shared channel resource for the moment, the SR (Scheduling Request) will be triggered to request the base station to allocate uplink shared channel resource to the BSR that needs to be transmitted.

After the SR is triggered, there are two ways to transmit the SR, that is, the SR is transmitted by a dedicated scheduling request resource (D-SR), and the SR is performed by a random access procedure (RA-SR).

Dedicated SR (D-SR): When the UE and the base station are in a synchronized status, there is not necessarily a resource which transmits the D-SR, but in a non-synchronized status, it is necessary that there is no D-SR resource. The D-SR is allocated by RRC (Radio Resource Control) and is carried by a PUCCH (Physical Uplink Control Channel). SR is transmitted using D-SR resources.

Random access SR (RA-SR): The SR is transmitted using a random access procedure.

The basic principle of SR transmission is that RA-SR is not used as long as there is a D-SR resource.

The time point of transmitting SR: Before receiving the uplink shared channel resource for transmitting data, allocated by the base station for the UE, the SR may be repeatedly transmitted on the resource capable of transmitting the SR.

2) Numerology and/or TTI Length

Numerology is a terminology of 3GPP RAN1, and may be translated into baseband parameters. The main difference between different numerologies is that the subcarrier spacings supported by different numerologies are different. For example, a subcarrier spacing of 15 KHz and a subcarrier spacing of 60 KHz correspond to two different numerologies and/or TTI lengths. For example, the subcarrier spacing supported by the 5G NR (New Radio) system at least includes 15 KHz and 60 kHz, and the numerologies corresponding to the two different subcarrier spacings are two independent numerologies. In general, the numerology used by terminals moving at a high speed is different from the numerology used by terminals moving at a low speed; the numerologies used for high frequency and low frequency are also different. In addition to the fact that the use of different numerologies is related to the moving speed and frequency, there is another understanding in the industry that the numerologies that may be used by different services may also be different; for example, URLLC (Ultra Reliable & Low Latency Communication) and eMBB (Enhanced Mobile Broadband) may use different numerologies.

3) TTI Length

TTI is the transmission time interval. In a conventional LTE system, the TTI length is 1 ms. Starting from LTE R14, in order to support delay reduction, different TTI lengths, such as one OFDM (Orthogonal Frequency Division Multiplexing) symbol length, are introduced.

Different TTI lengths continue to be used in 5G systems and may be applied to each numerology. That is, different TTI lengths may be used for different numerologies in 5G NR, and the same TTI length may also be used. Moreover, the TTI length used by a certain numerology for different terminals at any time point may also be dynamically varied. The selection of the TTI length is mainly related to the service delay. For example, the URLLC service may have a shorter TTI length selected for it, such as a TTI length of one OFDM symbol, since the supported delay for the URLLC service has a higher requirement.

For a LTE system, all the terminal-aggregated cells use the same numerology and/or TTI length. However, unlike the LTE system, the 5G system supports the numerology and/or TTI length more flexibly. For example, one terminal-aggregated cell may support multiple numerologies and/or TTI lengths. The numerologies and/or TTI lengths supported by different terminal-aggregated cells may be the same or different.

The 5G system supports the coexistence of a variety of numerologies and/or TTI lengths, and the numerologies and/or TTI lengths that may be used by one bearer channel/logical channel of the terminal is configured by the network side to the terminal. In this case, it is necessary to address the problem of how to perform uplink data transmission in a case that the terminal is out of sync in uplink on the numerologies and/or TTI lengths that may be used by the terminal, when there is uplink data transmission requirement in a certain bearer channel/logical channel of the terminal.

SUMMARY

In view of the above technical problem, embodiments of the present disclosure provide an SR/BSR triggering method and device, and propose a new SR/BSR triggering mechanism to address the problem of how to perform uplink data transmission in a case that the terminal is out of sync in uplink on the numerologies and/or TTI lengths that may be used by the terminal, when there is uplink data transmission requirement in a certain bearer channel/logical channel of the terminal.

According to an aspect of the embodiments of the present disclosure, an SR/BSR triggering method is provided, the method including:

triggering an SR (Scheduling Request) process and/or a BSR (Buffer Status Report) process, if there is uplink data transmission requirement in a bearer channel and/or a logical channel of a terminal, and there is no uplink resource available to the terminal on physical resources corresponding to numerologies and/or Transmission Time Interval (TTI) lengths available to the bearer channel and/or the logical channel.

Optionally, the triggering the SR process and/or the BSR process includes:

if a SR and/or a BSR is capable of being transmitted only on physical resources corresponding to one or more specific numerologies and/or TTI lengths corresponding to the bearer channel and/or the logical channel, and if the terminal is in sync in uplink on a physical resource corresponding to at least one of the one or more numerologies and/or TTI lengths, then sending the SR by the terminal to a network side by using the physical resource corresponding to the at least one numerology and/or TTI length to obtain an uplink scheduling grant (UL grant); and if the UL grant is capable of carrying data, then transmitting the data directly; otherwise, transmitting BSR information through the UL grant.

Optionally, if the SR and/or the BSR is capable of being transmitted only on physical resources corresponding to one or more specific numerologies and/or TTI lengths corresponding to the bearer channel and/or the logical channel, then a corresponding numerology and/or TTI length is determined according to delay requirements or quality of service (QoS) requirements corresponding to a service of triggering the SR and/or the BSR.

Optionally, the triggering the SR and/or the BSR process includes:

if the SR and/or the BSR may be transmitted only on physical resources corresponding to one or more specific numerologies and/or TTI lengths corresponding to the bearer channel and/or the logical channel, and if the terminal is out of sync in uplink on all the physical resources corresponding to the numerologies and/or the TTI lengths, then initiating a random access procedure by the terminal to a network by using a physical resource corresponding to at least one numerology and/or TTI length to obtain uplink synchronization and a uplink scheduling grant (UL grant); and if the UL grant may carry data, then transmitting the data directly; otherwise, transmitting BSR information through the UL grant.

Optionally, the triggering the SR and/or BSR process includes:

if the SR and/or the BSR may be transmitted on a physical resource corresponding to any numerology and/or TTI length, and if the terminal is in sync in uplink on a physical resource corresponding to at least one of the numerologies and/or the TTI lengths, and if the terminal has an uplink scheduling grant (UL grant) on the physical resource corresponding to at least one numerology and/or TTI length, then:

transmitting BSR information directly through the UL grant; determining by a network, according to the BSR information, information on the bearer channel/the logical channel of the terminal that has uplink data to be transmitted; determining by the network, according to a mapping relationship between the bearer channel/logical channel and the numerologies and/or the TTI lengths, available numerologies and/or TTI lengths corresponding to the bearer channel/the logical channel of the terminal; selecting by the network, a numerology and/or a TTI length for data transmission from the available numerologies and/or TTI lengths; and determining a physical resource corresponding to the numerology and/or TTI length.

Optionally, if the terminal is out of sync in uplink on the physical resource corresponding to the numerology and/or TTI length selected for the data transmission, then the terminal is triggered to initiate a random access procedure on the physical resource corresponding to the numerology and/or TTI length to obtain uplink synchronization.

Optionally, the triggering the SR and/or BSR process includes:

if the SR and/or the BSR may be transmitted on the physical resource corresponding to any numerology and/or TTI length, and if the terminal does not have an UL grant on the physical resource corresponding to said any numerology and/or TTI length, then selecting by the terminal at least one numerology and/or TTI length to initiate a random access procedure and obtain an uplink scheduling grant (UL grant).

Optionally, if a physical resource corresponding to the numerology and/or TTI length which obtains the UL grant may be used to carry data of the bearer channel/the logical channel of the terminal that currently has the uplink data transmission requirement, and if the UL grant may carry all the data to be transmitted, then the UL grant is used directly for data transmission.

Optionally, if a physical resource corresponding to the numerology and/or TTI length which obtains the UL grant may be used to carry the data of the bearer channel/the logical channel of the terminal that currently has the uplink data transmission requirement, and if the UL grant may not carry all data to be transmitted, then the UL grant is used to transmit BSR information, the network determines, according to the BSR information, information on the bearer channel/the logical channel of the terminal that has uplink data to be transmitted, determines available numerologies and/or TTI lengths corresponding to the bearer channel/the logical channel of the terminal according to a mapping relationship between the bearer channel/logical channel and the numerologies and/or the TTI lengths, selects the numerology and/or TTI length for data transmission from the available numerologies and/or TTI lengths, and determines a physical resource corresponding to the numerology and/or TTI length.

Optionally, if a physical resource corresponding to the numerology and/or TTI length selected for the data transmission is out of sync in uplink, then the terminal is triggered to initiate a random access procedure on the physical resource corresponding to the numerology and/or TTI length to obtain uplink synchronization.

Optionally, the triggering the SR and/or BSR process includes:

if the SR and/or the BSR may be transmitted on a physical resource corresponding to any numerology and/or any TTI length, and if the terminal is out of sync in uplink on physical resources corresponding to all numerologies and/or TTI lengths, then initiating a random access procedure by the terminal to the network by using the physical resource corresponding to at least one numerology and/or TTI length to obtain uplink synchronization and uplink scheduling grant (UL) grant.

Optionally, if the physical resource corresponding to the numerology and/or TTI length which obtains the UL grant may be used to carry data of the bearer channel/logical channel of the terminal that currently has a uplink data transmission requirement, and if the UL grant may carry all data to be transmitted, then the UL grant is used directly for data transmission.

Optionally, if the UL grant corresponding to the numerology and/or TTI length which obtains the UL grant may not carry all data to be transmitted, then the UL grant is used to transmit BSR information, the network determines, according to the BSR information, information on the bearer channel/logical channel of the terminal that has uplink data to be transmitted, determines available numerologies and/or TTI lengths corresponding to the bearer channel/logical channel of the terminal according to a mapping relationship between the bearer channel/logical channel and the numerologies and/or the TTI lengths, selects a numerology and/or TTI length for data transmission from the available numerologies and/or TTI lengths, and determines the physical resources corresponding to the available numerologies and/or TTI lengths.

Optionally, if the terminal is out of sync in uplink on the physical resource corresponding to the numerology and/or TTI length selected for the data transmission, then the terminal is triggered to initiate a random access procedure on the physical resource corresponding to the numerology and/or TTI length to obtain uplink synchronization.

Optionally, a fact that the SR and/or the BSR triggered by one bearer channel/logical channel of the terminal may be transmitted only on the physical resources corresponding to one or more specific numerologies and/or TTI lengths corresponding to the one bearer channel/logical channel is specified by a protocol, or notified by a network side to the terminal; or a fact that the SR and/or the BSR triggered by one bearer channel/logical channel of the terminal is transmitted on the physical resource corresponding to any numerology and/or TTI length is specified by a protocol, or notified by the network side to the terminal; or whether the SR and/or the BSR triggered by one bearer channel/logical channel of the terminal may be transmitted only on the physical resource corresponding to one or more specific numerologies and/or TTI lengths corresponding to this bearer channel/logical channel or may be transmitted on the physical resource corresponding to any numerology and/or TTI length is specified by a protocol, or notified by the network side to the terminal.

Optionally, the terminal determines, based on a cell or a cell group, whether the terminal is in sync in uplink on a physical resource corresponding to one numerology and/or TTI length, wherein physical resources corresponding to all numerologies and/or TTI lengths in one cell or one cell group have same uplink synchronization status.

Optionally, the terminal determines, according to the cell or cell group in which the physical resource corresponding to the numerology and/or TTI length is located, whether the terminal is in sync in uplink on the physical resource corresponding to one numerology and/or one TTI length; and if the terminal is in sync in uplink on the cell or cell group in which the physical resource corresponding to the numerology and/or TTI length is located, then the terminal is in sync in uplink on the physical resource corresponding to the numerology and/or TTI length; otherwise, the terminal is out of sync in uplink on the physical resource corresponding to the numerology and/or TTI length.

Optionally, each cell or cell group corresponds to a Time Alignment (TA) timer for uplink synchronization maintenance, wherein starting, restarting or timing-out of the TA timer is maintained based on the cell or the cell group, and TA timers corresponding to different cells or cell groups are configured with a same length or different lengths.

Optionally, the method further includes:

determining by the terminal, according to a uplink synchronization status of the physical resource corresponding to the numerology and/or the TTI length, whether the terminal is synchronized on the physical resource corresponding to the numerology and/or the TTI length.

Optionally, each numerology and/or TTI length corresponds to a Time Alignment (TA) timer for uplink synchronization maintenance, wherein starting, restarting or timing-out of the TA timer is maintained based on the numerology and/or TTI length, and TA timers corresponding to different numerologies and/or TTI lengths are configured with a same length or different lengths.

According to a second aspect of the embodiments of the present disclosure, an uplink data transmission device applied in a terminal is also provided, the device including:

a triggering module, configured to trigger an SR (Scheduling Request) process and/or a BSR (Buffer Status Report) process, if there is uplink data transmission requirement in a bearer channel and/or a logical channel of a terminal, and there is no uplink resource available to the terminal on physical resources corresponding to numerologies and/or Transmission Time Interval (TTI) lengths available to the bearer channel and/or the logical channel.

Optionally, the triggering module is further configured to: if a SR and/or a BSR is capable of being transmitted only on physical resources corresponding to one or more specific numerologies and/or TTI lengths corresponding to the bearer channel and/or the logical channel, and if the terminal is in sync in uplink on a physical resource corresponding to at least one of the one or more numerologies and/or TTI lengths, send the SR to a network side by using the physical resource corresponding to the at least one numerology and/or TTI length to obtain an uplink scheduling grant (UL grant); and if the UL grant is capable of carrying data, then transmit the data directly; otherwise, transmit BSR information through the UL grant.

Optionally, the triggering module is further configured to: if the SR and/or the BSR is capable of being transmitted only on physical resources corresponding to one or more specific numerologies and/or TTI lengths corresponding to the bearer channel and/or the logical channel, determine a corresponding numerology and/or TTI length according to delay requirements or quality of service (QoS) requirements corresponding to a service of triggering the SR and/or the BSR.

Optionally, the triggering module is further configured to: if the SR and/or the BSR is capable of being transmitted only on physical resources corresponding to one or more specific numerologies and/or TTI lengths corresponding to the bearer channel and/or the logical channel, and if the terminal is out of sync in uplink on all physical resources corresponding to the numerologies and/or the TTI lengths, initiate a random access procedure to a network by using a physical resource corresponding to at least one numerology and/or TTI length to obtain uplink synchronization and a uplink scheduling grant (UL grant); and if the UL grant is capable of carrying data, then transmit the data directly; otherwise, transmit BSR information through the UL grant.

Optionally, the triggering module is further configured to: if the SR and/or the BSR is capable of being transmitted on a physical resource corresponding to any numerology and/or TTI length, and if the terminal is in sync in uplink on a physical resource corresponding to at least one of the numerologies and/or the TTI lengths, and if the terminal has an uplink scheduling grant (UL grant) on the physical resource corresponding to at least one numerology and/or TTI length, transmit BSR information directly through the UL grant so that a network determines, according to the BSR information, information on the bearer channel/the logical channel of the terminal that has uplink data to be transmitted; the network determines, according to a mapping relationship between the bearer channel/logical channel and the numerologies and/or the TTI lengths, available numerologies and/or TTI lengths corresponding to the bearer channel/ the logical channel of the terminal; the network selects, a numerology and/or a TTI length for data transmission from the available numerologies and/or TTI lengths; and the network determines a physical resource corresponding to the numerology and/or TTI length.

Optionally, if the terminal is out of sync in uplink on the physical resource corresponding to the numerology and/or TTI length selected for the data transmission, then the triggering module triggers the terminal to initiate a random access procedure on the physical resource corresponding to the numerology and/or TTI length to obtain uplink synchronization.

Optionally, the triggering module is further configured to: if the SR and/or the BSR is capable of being transmitted on the physical resource corresponding to any numerology and/or TTI length, and if the terminal does not have an UL grant on the physical resource corresponding to the any numerology and/or TTI length, select at least one numerology and/or TTI length to initiate a random access procedure and obtain an uplink scheduling grant (UL grant).

Optionally, if a physical resource corresponding to the numerology and/or TTI length which obtains the UL grant is capable of being used to carry data of the bearer channel/the logical channel of the terminal that currently has the uplink data transmission requirement, and if the UL grant is capable of carrying all data to be transmitted, then the triggering module directly uses the UL grant for data transmission.

Optionally, if a physical resource corresponding to the numerology and/or TTI length which obtains the UL grant is capable of being used to carry the data of the bearer channel/the logical channel of the terminal that currently has the uplink data transmission requirement, and if the UL grant is incapable of carrying all data to be transmitted, then the UL grant is used to transmit BSR information, the network determines, according to the BSR information, information on the bearer channel/the logical channel of the terminal that has uplink data to be transmitted, determines available numerologies and/or TTI lengths corresponding to the bearer channel/the logical channel of the terminal according to a mapping relationship between the bearer channel/the logical channel and the numerologies and/or the TTI lengths, selects the numerology and/or TTI length for data transmission from the available numerologies and/or TTI lengths, and determines a physical resource corresponding to the numerology and/or TTI length.

Optionally, if a physical resource corresponding to the numerology and/or TTI length selected for the data transmission is out of sync in uplink, then triggering module triggers the terminal to initiate a random access procedure on the physical resource corresponding to the numerology and/or TTI length to obtain uplink synchronization.

Optionally, the triggering module is further configured to: if the SR and/or the BSR is capable of being transmitted on a physical resource corresponding to any numerology and/or any TTI length, and if the terminal is out of sync in uplink on physical resources corresponding to all numerologies and/or TTI lengths, initiate a random access procedure to the network by using the physical resource corresponding to at least one numerology and/or TTI length to obtain uplink synchronization and uplink scheduling grant (UL grant).

Optionally, if the physical resource corresponding to the numerology and/or TTI length which obtains the UL grant is capable of being used to carry data of the bearer channel/ logical channel of the terminal that currently has the uplink data transmission requirement, and if the UL grant is capable of carrying all data to be transmitted, then the triggering module directly uses the UL grant for data transmission.

Optionally, if the UL grant corresponding to the numerology and/or TTI length which obtains the UL grant is incapable of carrying all data to be transmitted, then the UL grant is used to transmit BSR information, so that the network determines, according to the BSR information, information on the bearer channel/logical channel of the terminal that has uplink data to be transmitted, the network determines available numerologies and/or TTI lengths corresponding to the bearer channel/logical channel of the terminal according to a mapping relationship between the bearer channel/logical channel and the numerologies and/or the TTI lengths, the network selects a numerology and/or TTI length for data transmission from the available numerologies and/or TTI lengths, and determines the physical resources corresponding to the available numerologies and/ or TTI lengths.

Optionally, if the terminal is out of sync in uplink on the physical resource corresponding to the numerology and/or TTI length selected for the data transmission, then the triggering module triggers the terminal to initiate a random access procedure on the physical resource corresponding to the numerology and/or TTI length to obtain uplink synchronization.

Optionally, a fact that the SR and/or the BSR triggered by one bearer channel/logical channel of the terminal is capable of being transmitted only on the physical resources corresponding to one or more specific numerologies and/or TTI lengths corresponding to the one bearer channel/logical channel is specified by a protocol, or notified by a network side to the terminal; or a fact that the SR and/or the BSR triggered by one bearer channel/logical channel of the terminal is capable of being transmitted on the physical resource corresponding to any numerology and/or TTI length is specified by a protocol, or notified by the network side to the terminal; or whether the SR and/or the BSR triggered by one bearer channel/logical channel of the terminal is capable of being transmitted only on the physical resources corresponding to one or more specific numerologies and/or TTI lengths corresponding to this bearer channel/logical channel or is capable of being transmitted on the physical resource corresponding to any numerology and/or TTI length is specified by a protocol, or notified by the network side to the terminal.

Optionally, the device further includes:

a first determining module, configured to determine, based on a cell or a cell group, whether the terminal is in sync in uplink on a physical resource corresponding to one numerology and/or TTI length, wherein physical resources corresponding to all numerologies and/or TTI lengths in one cell or one cell group have same uplink synchronization status.

Optionally, the first determining module determines, according to the cell or cell group in which the physical resource corresponding to the numerology and/or TTI length is located, whether the terminal is in sync in uplink on the physical resource corresponding to one numerology and/or one TTI length; and if the terminal is in sync in uplink on the cell or cell group in which the physical resource corresponding to the numerology and/or TTI length is located, then the terminal is in sync in uplink on the physical resource corresponding to the numerology and/or TTI length; otherwise, the terminal is out of sync in uplink on the physical resource corresponding to the numerology and/or TTI length.

Optionally, each cell or cell group corresponds to a Time Alignment (TA) timer for uplink synchronization maintenance, wherein starting, restarting or timing-out of the TA timer is maintained based on the cell or the cell group, and TA timers corresponding to different cells or cell groups are configured with a same length or different lengths.

Optionally, the device further includes:

a second determining module, configured to determine, according to a uplink synchronization status of the physical resource corresponding to the numerology and/or the TTI length, whether the terminal is in sync on the physical resource corresponding to the numerology and/or the TTI length.

Optionally, each numerology and/or TTI length corresponds to a Time Alignment (TA) timer for uplink synchronization maintenance, wherein starting, restarting or timing-out of the TA timer is maintained based on the numerology and/or TTI length, and TA timers corresponding to different numerologies and/or TTI lengths are configured with a same length or different lengths.

According to a third aspect of the embodiments of the present disclosure, a terminal is also provided, which includes a memory, a processor, and a computer program stored in the memory and runnable on the processor, wherein the steps of the SR/BSR triggering method as described in the first aspect are implemented when the computer program is executed by the processor.

One of the above technical solutions has the following advantages or advantageous effects: if a bearer channel and/or a logical channel of the terminal has an uplink data transmission requirement, and there is no uplink resource available to the terminal on physical resources corresponding to numerologies and/or TTI lengths available to the bearer channel and/or the logical channel, the SR and/or the BSR process is triggered. In this manner, it is ensured that the terminal may perform normal uplink data transmission when multiple numerologies and/or TTI lengths coexist.

DETAILED DESCRIPTION

Figure 1:
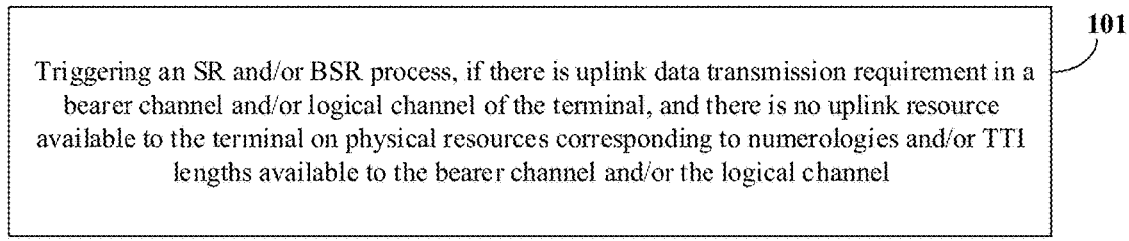
FIG. 1 is a flowchart of an uplink data transmission method in some embodiments of the present disclosure.

Exemplary embodiments of the present disclosure will be described in more detail below with reference to the accompanying drawings. While exemplary embodiments of the present disclosure are illustrated in the drawings, it should be understood that the present disclosure may be implemented in various ways and should not be limited by the embodiments set forth herein. Rather, these embodiments are provided so that the present disclosure may be more thoroughly understood and that the scope of the present disclosure may be fully conveyed to those skilled in the art.

For 5G systems, an important difference from traditional LTE systems is their greater flexibility in supporting numerologies and/or TTI lengths. For example, the same cell aggregated by one terminal may use multiple different numerologies and/or TTI lengths, and different terminal-aggregated cells may use the same or different numerologies and/or TTI lengths. In a case where multiple numerologies and/or TTI lengths may coexist, the numerologies and/or TTI lengths that may be used by one bearer channel/logical channel of the terminal are configured by the network side to the terminal. Based on this, some embodiments of the present disclosure provide an uplink data transmission method and device for addressing the problem of how to perform uplink data transmission in a case that the terminal is out of sync in uplink on the numerologies and/or TTI lengths that may be used by the terminal, when there is uplink data transmission requirement in a certain bearer channel/logical channel of the terminal.

Referring to FIG. 1, a flowchart of an uplink data transmission method is shown, which includes the following specific steps:

step 101: triggering an SR and/or BSR process, if there is uplink data transmission requirement in a bearer channel and/or logical channel of the terminal, and there is no uplink resource available to the terminal on physical resources corresponding to numerologies and/or TTI lengths available to the bearer channel and/or the logical channel.

Said there is no uplink resource available to the terminal on physical resources corresponding to numerologies and/or TTI lengths available to the bearer channel and/or the logical channel includes:

there is no uplink resource available to the terminal on physical resources corresponding to numerologies available to the bearer channel and/or the logical channel;

there is no uplink resource available to the terminal on physical resources corresponding to TTI lengths available to the bearer channel and/or the logical channel; and there is no uplink resource available to the terminal on physical resources corresponding to a combination of numerologies and TTI lengths available to the bearer channel and/or the logical channel includes.

Optional Manner 1:

if the SR and/or the BSR may be transmitted only on physical resources corresponding to one or more specific numerologies and/or TTI lengths corresponding to the bearer channel and/or logical channel, and if the terminal is in sync in uplink on the physical resource corresponding to at least one of the numerologies and/or TTI lengths, then sending SR by the terminal to a network side by using the physical resource corresponding to the at least one numerology and/or the TTI length to obtain an uplink scheduling grant (UL grant); and if the UL grant may carry data, then transmitting the data directly; otherwise, transmitting BSR information through the UL grant.

Said if the terminal is in sync in uplink on the physical resource corresponding to at least one of the numerologies and/or TTI lengths includes:

if the terminal is in sync in uplink on the physical resource corresponding to at least one of the numerologies;

if the terminal is in sync in uplink on the physical resource corresponding to at least one of the TTI lengths; and if the terminal is in sync in uplink on the physical resource corresponding to a combination of at least one of the numerologies and at least one of the TTI lengths.

Said sending SR by the terminal to a network side by using the physical resource corresponding to the at least one numerology and/or the TTI length includes:

sending SR by the terminal to a network side by using the physical resource corresponding to the at least one numerology;

sending SR by the terminal to a network side by using the physical resource corresponding to the at least one TTI length; and sending SR by the terminal to a network side by using the physical resource corresponding to a combination of the at least one numerology and the at least one TTI length.

Optionally, if the SR and/or the BSR may be transmitted only on physical resources corresponding to one or more specific numerologies and/or TTI lengths corresponding to the bearer channel and/or logical channel, then determining the corresponding numerology and/or TTI length according to the delay requirements or the quality of service (QoS) requirements corresponding to the service of triggering the SR and/or the BSR.

Said determining the corresponding numerology and/or TTI length includes:

determining the corresponding numerology;

determining the corresponding TTI length; and determining the corresponding numerology and the corresponding TTI length.

Optional Manner 2:

if the SR and/or the BSR may be transmitted only on physical resources corresponding to one or more specific numerologies and/or TTI lengths corresponding to the bearer channel and/or the logical channel, and if the terminal is out of sync in uplink on the physical resources corresponding to all the numerologies and/or TTI lengths, then initiating a random access procedure by the terminal to the network by using the physical resource corresponding to the at least one numerology and/or the TTI length to obtain uplink synchronization and UL grant; and if the UL grant may carry data, then transmitting the data directly; otherwise, transmitting BSR information through the UL grant.

Said if the terminal is out of sync in uplink on the physical resources corresponding to all the numerologies and/or TTI lengths includes:

if the terminal is out of sync in uplink on the physical resources corresponding to all the numerologies;

if the terminal is out of sync in uplink on the physical resources corresponding to all the TTI lengths; and if the terminal is out of sync in uplink on the physical resources corresponding to all the numerologies and all the TTI lengths.

Said initiating a random access procedure by the terminal to the network by using the physical resource corresponding to the at least one numerology and/or the TTI length includes:

initiating a random access procedure by the terminal to the network by using the physical resource corresponding to the at least one numerology;

initiating a random access procedure by the terminal to the network by using the physical resource corresponding to the at least one TTI length; and initiating a random access procedure by the terminal to the network by using the physical resource corresponding to a combination of the at least one numerology and the at least one TTI length.

Optional Manner 3:

if the SR and/or the BSR may be transmitted on the physical resource corresponding to any numerology and/or TTI length, and if the terminal is in sync in uplink on the physical resource corresponding to at least one of the numerologies and/or TTI lengths, and if the terminal has an UL grant on the physical resource corresponding to the at least one numerology and/or TTI length, then: transmitting BSR information directly through the UL grant; determining by the network, according to the BSR information, information on the bearer channel/logical channel of the terminal that has uplink data to transmit; determining by the network, according to a mapping relationship between the bearer channel/logical channel and the numerology and/or the TTI length, the available numerologies and/or TTI lengths corresponding to the bearer channel/logical channel of the terminal; selecting by the network, the numerology and/or TTI length for data transmission from the available numerologies and/or TTI lengths; and determining the physical resource corresponding to the numerology and/or TTI length.

Said if the terminal is in sync in uplink on the physical resource corresponding to at least one of the numerologies and/or TTI lengths includes:

if the terminal is in sync in uplink on the physical resource corresponding to at least one of the numerologies;

if the terminal is in sync in uplink on the physical resource corresponding to at least one of the TTI lengths; and if the terminal is in sync in uplink on the physical resource corresponding to a combination of at least one of the numerologies and at least one of the TTI lengths.

Said if the terminal has an UL grant on the physical resource corresponding to the at least one numerology and/or TTI length includes:

if the terminal has an UL grant on the physical resource corresponding to the at least one numerology;

if the terminal has an UL grant on the physical resource corresponding to the TTI length; and if the terminal has an UL grant on the physical resource corresponding to a combination of the at least one numerology and the TTI length.

It is noted that if the terminal is out of sync in uplink on the physical resource corresponding to the numerology and/or TTI length selected for the data transmission, then the terminal is triggered to initiate a random access procedure on the physical resource corresponding to the numerology and/or TTI length to obtain uplink synchronization.

Optional Manner 4:

if the SR and/or the BSR may be transmitted on the physical resource corresponding to any numerology and/or TTI length, and if the terminal does not have an UL grant on the physical resource corresponding to said any numerology and/or TTI length, then selecting by the terminal at least one numerology and/or TTI length to initiate a random access procedure and obtain an UL grant.

Said selecting by the terminal at least one numerology and/or TTI length to initiate a random access procedure includes:

selecting by the terminal at least one numerology to initiate a random access procedure;

selecting by the terminal at least one TTI length to initiate a random access procedure; and selecting by the terminal a combination of at least one numerology and the TTI length to initiate a random access procedure.

It is noted that if the physical resource corresponding to the numerology and/or TTI length which obtains the UL grant may be used to carry the data of the bearer channel/logical channel of the terminal that currently has the uplink data transmission requirement, and if the UL grant may carry all the data to be transmitted, then the UL grant is used directly for data transmission.

It is noted that if the physical resource corresponding to the numerology and/or TTI length which obtains the UL grant may be used to carry the data of the bearer channel/logical channel of the terminal that currently has the uplink data transmission requirement, and if the UL grant may not carry all the data to be transmitted, then the UL grant is used to transmit BSR information, the network determines information on the bearer channel/logical channel of the terminal that has uplink data to transmit according to the BSR information, determines the available numerologies and/or TTI lengths corresponding to the bearer channel/logical channel of the terminal according to a mapping relationship between the bearer channel/logical channel and the numerology and/or the TTI length, selects the numerology and/or TTI length for data transmission from the available numerologies and/or TTI lengths, and determines the physical resource corresponding to the numerology and/or TTI length.

It is noted that if the physical resource corresponding to the numerology and/or TTI length selected for the data transmission is out of sync in uplink, then the terminal is triggered to initiate a random access procedure on the physical resource corresponding to the numerology and/or TTI length to obtain uplink synchronization.

Optional Manner 5:

if the SR and/or the BSR may be transmitted on the physical resource corresponding to any numerology and/or TTI length, and if the terminal is out of sync in uplink on the physical resources corresponding to all the numerologies and/or the TTI lengths, then initiating a random access procedure by the terminal to the network by using the physical resource corresponding to at least one numerology and/or the TTI length to obtain uplink synchronization and UL grant.

It is noted that if the physical resource corresponding to the numerology and/or TTI length which obtains the UL grant may be used to carry the data of the bearer channel/logical channel of the terminal that currently has the uplink data transmission requirement, and if the UL grant may carry all the data to be transmitted, then the UL grant is used directly for data transmission.

It is noted that if the UL grant corresponding to the numerology and/or TTI length which obtains the UL grant may not carry all the data to be transmitted, the UL grant is used to transmit the BSR information, the network determines information on the bearer channel/logical channel of the terminal that has uplink data to transmit according to the BSR information, determines the available numerologies and/or TTI lengths corresponding to the bearer channel/logical channel of the terminal according to a mapping relationship between the bearer channel/logical channel and the numerology and/or the TTI length, selects the numerology and/or TTI length for data transmission from the available numerologies and/or TTI lengths, and determines the physical resources corresponding to the available numerologies and/or TTI lengths. If the terminal is out of sync in uplink on the physical resource corresponding to the numerology and/or TTI length selected for the data transmission, the terminal is triggered to initiate a random access procedure on the physical resource corresponding to the numerology and/or TTI length to obtain uplink synchronization.

In some embodiments of the present disclosure, the fact that the SR and/or the BSR triggered by one bearer channel/logical channel of the terminal may be transmitted only on the physical resource corresponding to one or more specific numerologies and/or TTI lengths corresponding to this bearer channel/logical channel is specified by a protocol, or notified by the network side to the terminal; or the fact that the SR and/or the BSR triggered by one bearer channel/logical channel of the terminal is transmitted on the physical resource corresponding to any numerology and/or TTI length is specified by a protocol, or notified by the network side to the terminal; or whether the SR and/or the BSR triggered by one bearer channel/logical channel of the terminal may be transmitted only on the physical resource corresponding to one or more specific numerologies and/or TTI lengths corresponding to this bearer channel/logical channel or may be transmitted on the physical resource corresponding to any numerology and/or TTI length is specified by a protocol, or notified by the network side to the terminal.

In some embodiments of the present disclosure, the terminal determines, based on a cell or a cell group, whether the terminal is in sync in uplink on the physical resource corresponding to one numerology and/or one TTI length, wherein the physical resources corresponding to all the numerologies and/or the TTI lengths in one cell or one cell group have the same uplink synchronization status.

Specifically, the terminal determines, according to the cell or cell group in which the physical resource corresponding to the numerology and/or TTI length is located, whether the terminal is in sync in uplink on the physical resource corresponding to one numerology and/or one TTI length;

if the terminal is in sync in uplink on the cell or cell group in which the physical resource corresponding to the numerology and/or TTI length is located, then the terminal is in sync in uplink on the physical resource corresponding to the numerology and/or TTI length; otherwise, the terminal is out of sync in uplink on the physical resource corresponding to the numerology and/or TTI length.

In some embodiments of the present disclosure, each cell or cell group corresponds to an uplink synchronization maintenance timer (TA timer), wherein the TA timer is started, restarted, or timed out based on the cell or the cell group, and the TA timers corresponding to different cells or cell groups are configured with the same or different lengths.

In some embodiments of the present disclosure, the terminal determines, according to the uplink synchronization status of the physical resource corresponding to the numerology and/or the TTI length, whether the terminal is synchronized on the physical resource corresponding to the numerology and/or the TTI length. Each numerology and/or TTI length corresponds to an uplink synchronization maintenance timer (TA timer), wherein the TA timer is started, restarted, or timed out based on the numerology and/or TTI length, and the TA timers corresponding to different numerologies and/or TTI lengths are configured with the same or different lengths.

Said TA timers corresponding to different numerologies and/or TTI lengths are configured with the same or different lengths includes:

TA timers corresponding to different numerologies are configured with the same or different lengths;

TA timers corresponding to different TTI lengths are configured with the same or different lengths; and TA timers corresponding to a combination of different numerologies and TTI lengths are configured with the same or different lengths.

In some embodiments of the present disclosure, an SR and/or BSR process is triggered, if there is uplink data transmission requirement in a bearer channel and/or logical channel of the terminal, and there is no uplink resource available to the terminal on physical resources corresponding to numerologies and/or TTI lengths available to the bearer channel and/or the logical channel; the terminal selects SR and/or BSR to transmit resources, that is, a new SR and/or BSR triggering mechanism is introduced. In this manner, it is ensured that the terminal may perform normal uplink data transmission when multiple numerologies and/or TTI lengths coexist.

In some embodiments of the present disclosure, the SR and/or the BSR may be transmitted only on physical resources corresponding to certain one or more specific numerologies and/or TTI lengths corresponding to the bearer channel and/or logical channel.

Figure 2:
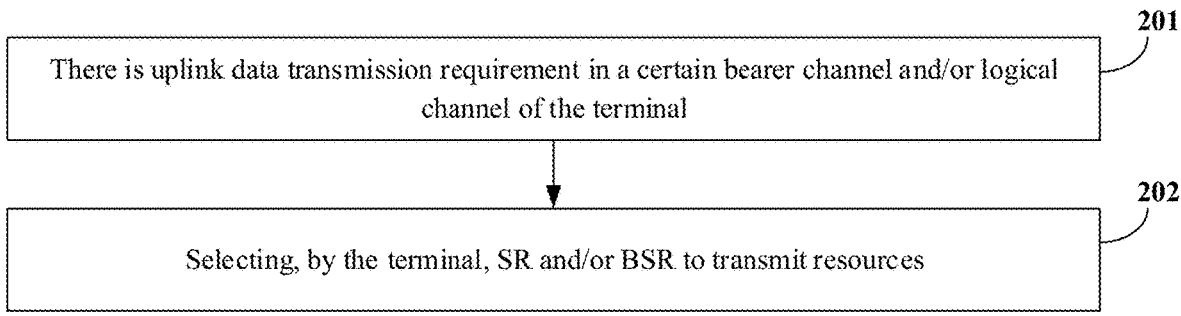
FIG. 2 is a flowchart of an uplink data transmission method in some embodiments of the present disclosure.

Referring to FIG. 2, a flowchart of an SR/BSR triggering method is shown, which includes the following specific steps:

step 201: there is uplink data transmission requirement in a certain bearer channel and/or logical channel of the terminal;

when there is uplink data transmission requirement in a certain bearer channel and/or logical channel of the terminal, but there is no uplink resource available to the terminal on physical resources corresponding to numerologies and/or TTI lengths available to the bearer channel and/or the logical channel, then triggering the SR and/or the BSR process;

step 202: selecting, by the terminal, SR and/or BSR to transmit resources.

Whether the SR and/or the BSR triggered by a certain bearer channel/logical channel of the terminal may be transmitted only on the physical resource corresponding to certain one or more specific numerologies and/or TTI lengths corresponding to this bearer channel/logical channel or may be transmitted on the physical resource corresponding to any numerology and/or TTI length is specified by a protocol, or notified by the network side to the terminal.

If the SR (Scheduling Request)/BSR (Buffer Status Report) may be transmitted only on the physical resource corresponding to certain one or more specific numerologies and/or TTI lengths corresponding to this bearer channel/logical channel:

manner 1: if the terminal is in sync in uplink on the physical resource corresponding to at least one of the numerologies and/or TTI lengths, then:

sending SR by the terminal to a network side by using the physical resource corresponding to the at least one numerology and/or the TTI length to obtain an uplink scheduling grant (UL grant); if the UL grant just may carry data, then transmitting the data directly; otherwise, transmitting BSR information through the UL grant.

manner 2: if the terminal is out of sync in uplink on the physical resource corresponding to the numerology and/or TTI length, then:

initiating a random access procedure by the terminal to the network by using the physical resource corresponding to said at least one numerology and/or TTI length to obtain uplink synchronization and UL grant; if the UL grant just may carry data, then transmitting the data directly; otherwise, transmitting BSR information through the UL grant.

In some embodiments of the present disclosure, the SR and/or the BSR is transmitted on the physical resource corresponding to any numerology and/or TTI length.

Figure 3:
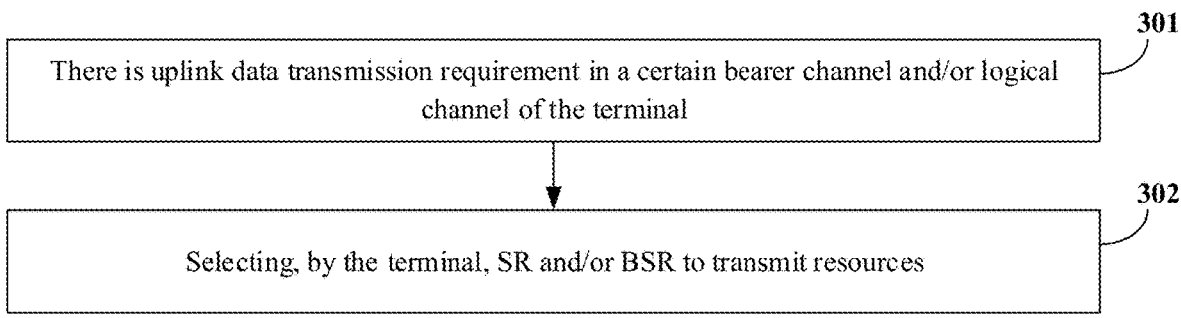
FIG. 3 is a flowchart of an uplink data transmission method in some embodiments of the present disclosure.

Referring to FIG. 3, a flowchart of an SR/BSR triggering method is shown, which includes the following specific steps:

step 301: there is uplink data transmission requirement in a certain bearer channel and/or logical channel of the terminal;

when there is uplink data transmission requirement in a certain bearer channel and/or logical channel of the terminal, but there is no uplink resource available to the terminal on physical resources corresponding to numerologies and/or TTI lengths available to the bearer channel and/or the logical channel, then triggering the SR and/or the BSR process;

step 302: selecting, by the terminal, SR and/or BSR to transmit resources.

Whether the SR and/or the BSR triggered by a certain bearer channel/logical channel of the terminal may be transmitted only on the physical resource corresponding to certain one or more specific numerologies and/or TTI lengths corresponding to this bearer channel/logical channel or may be transmitted on the physical resource corresponding to any numerology and/or TTI length is specified by a protocol, or notified by the network side to the terminal.

If the SR/BSR may be transmitted on the physical resource corresponding to any numerology and/or TTI length:

manner 1: if the terminal is in sync in uplink on the physical resource corresponding to at least one of the numerologies and/or TTI lengths, then:

i) if the terminal has an UL grant on the physical resource corresponding to the numerology and/or TTI length that is in sync in uplink, then: transmitting BSR information directly through the UL grant; determining by the network, according to the BSR information, information on the bearer channel/logical channel of the terminal that has uplink data to transmit; determining by the network, according to a mapping relationship between the bearer channel/logical channel and the numerology and/or the TTI length, the available numerologies and/or TTI lengths corresponding to the bearer channel/logical channel of the terminal; selecting by the network, the numerology and/or TTI length for data transmission from the available numerologies and/or TTI lengths; and determining the physical resource corresponding to the numerology and/or TTI length;

wherein it is noted that terminal is out of sync in uplink on the physical resource corresponding to the numerology and/or TTI length selected for the data transmission, then the terminal may be triggered to initiate a random access procedure on the physical resource corresponding to the numerology and/or TTI length to obtain uplink synchronization;

ii) if the terminal does not have an UL grant on the physical resource corresponding to the numerology and/or TTI length that is in sync in uplink, then selecting by the terminal at least one numerology and/or TTI length to initiate a random access procedure and obtain an UL grant;

wherein it is noted that if the physical resource corresponding to the numerology and/or TTI length which obtains the UL grant may be used to carry the data of the bearer channel/logical channel of the terminal that currently has the uplink data transmission requirement, and if the UL grant may carry all the data to be transmitted, then the UL grant is used directly for data transmission.

Otherwise, the UL grant is used to transmit BSR information. The network determines information on the bearer channel/logical channel of the terminal that has uplink data to transmit according to the BSR information, determines the available numerologies and/or TTI lengths corresponding to the bearer channel/logical channel of the terminal according to a mapping relationship between the bearer channel/logical channel and the numerology and/or the TTI length, selects the numerology and/or TTI length for data transmission from the available numerologies and/or TTI lengths, and determines the physical resource corresponding to the numerology and/or TTI length.

If the physical resource corresponding to the numerology and/or TTI length selected for the data transmission is out of sync in uplink, then the terminal may be triggered to initiate a random access procedure on the physical resource corresponding to the numerology and/or TTI length to obtain uplink synchronization.

manner 2: if the terminal is out of sync in uplink on the physical resource corresponding to all the numerologies and/or TTI lengths, then:

initiating a random access procedure by the terminal to the network by using the physical resource corresponding to at least one numerology and/or the TTI length to obtain uplink synchronization and UL grant.

It is noted that if the physical resource corresponding to the numerology and/or TTI length which obtains the UL grant may be used to carry the data of the bearer channel/logical channel of the terminal that currently has the uplink data transmission requirement, and if the UL grant may carry all the data to be transmitted, then the UL grant is used directly for data transmission.

Otherwise, the UL grant is used to transmit the BSR information, the network determines information on the bearer channel/logical channel of the terminal that has uplink data to transmit according to the BSR information, determines the available numerologies and/or TTI lengths corresponding to the bearer channel/logical channel of the terminal according to a mapping relationship between the bearer channel/logical channel and the numerology and/or the TTI length, selects the numerology and/or TTI length for data transmission from the available numerologies and/or TTI lengths, and determines the physical resources corresponding to the available numerologies and/or TTI lengths.

Further, if the terminal is out of sync in uplink on the physical resource corresponding to the numerology and/or TTI length selected for the data transmission, the terminal may be triggered to initiate a random access procedure on the physical resource corresponding to the numerology and/or TTI length to obtain uplink synchronization.

On the basis of the above described embodiments, some embodiments of the present disclosure will be further described below. In some scenarios to which the embodiments of the present disclosure are applicable, uplink synchronization maintenance is performed based on a cell/cell group, and in some scenarios to which embodiments of the present disclosure are applicable, uplink synchronization maintenance is performed based on numerology and/or TTI length.

In some embodiments of the present disclosure, the uplink synchronization of the terminal on the physical resources corresponding to the numerology and/or the TTI length is maintained.

The network side configures the TA (timing advance amount) information of the group to which a cell belongs when adding the cell to the terminal. If no information has been configured, the cell belongs to the same TA group as the first added cell by default.

The length of the uplink synchronization maintenance timer (TA timer) is configured based on the cell/cell group. If the TA timers of different cell groups have the same length, only one TA timer has to be configured based on the terminal.

The TA timer maintenance is based on the cell/cell group, including the start/restart/timeout determination of the TA timer. Whether the terminal is in sync in uplink on the physical resource corresponding to the numerology and/or the TTI length is determined based on whether the TA timer of the corresponding cell/cell group corresponding to the numerology and/or the TTI length is running, and if the TA timer of the corresponding cell/cell group corresponding to the numerology and/or the TTI length is running, the terminal is in sync in uplink on the corresponding physical resource; otherwise, the terminal is out of sync in uplink.

In some embodiments of the present disclosure, the uplink synchronization of the terminal on the physical resources corresponding to the numerology and/or the TTI length is maintained.

For an ultra large bandwidth cell, even within one cell, the uplink synchronization status may be different for the physical resources corresponding to the numerologies and/or the TTI lengths at different frequency points, so it is necessary to introduce uplink synchronization maintenance based on numerology and/or TTI length and having a smaller granularity than the cell.

The length of TA timer based on the numerology and/or the TTI length is configured based on the numerology and/or the TTI length. If the lengths of the TA timers of different numerologies and/or TTI lengths are the same, only one TA timer has to be configured based on the terminal.

The TA timer maintenance is based on the numerology and/or TTI length, including the start/restart/timeout determination of the TA timer. Whether the terminal is in sync in uplink on the physical resource corresponding to the numerology and/or the TTI length is determined based on whether the TA timer corresponding to the numerology and/or the TTI length is running, and if the TA timer corresponding to the numerology and/or the TTI length is running, the terminal is in sync in uplink on the physical resource corresponding to the numerology and/or TTI length; otherwise, the terminal is out of sync in uplink.

Figure 4:
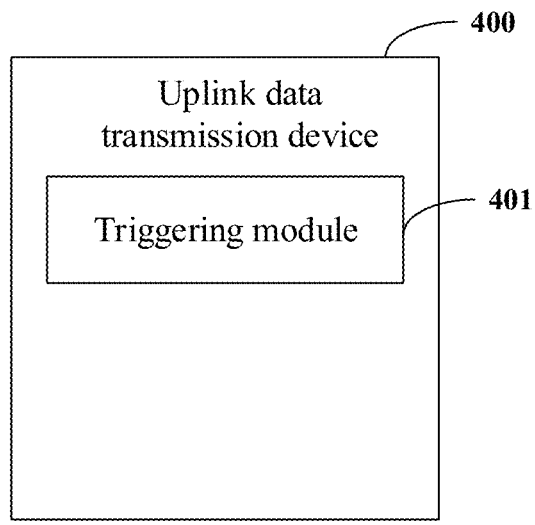
FIG. 4 is a block diagram of an uplink data transmission device in some embodiments of the present disclosure.

Referring to FIG. 4, an SR/BSR triggering device for a terminal is shown, and the device 400 includes:

a triggering module 401, configured to trigger an SR and/or BSR process, if there is uplink data transmission requirement in a bearer channel and/or logical channel of the terminal, and there is no uplink resource available to the terminal on physical resources corresponding to numerologies and/or TTI lengths available to the bearer channel and/or the logical channel.

In some embodiments of the present disclosure, optionally, the triggering module 401 is further configured to: if the SR and/or the BSR may be transmitted only on physical resources corresponding to one or more specific numerologies and/or TTI lengths corresponding to the bearer channel and/or logical channel, and if the terminal is in sync in uplink on the physical resource corresponding to at least one of the numerologies and/or TTI lengths, then send SR by the terminal to a network side by using the physical resource corresponding to the at least one numerology and/or the TTI length to obtain an UL grant; and if the UL grant may carry data, then transmit the data directly; otherwise, transmit BSR information through the UL grant.

Optionally, the triggering module 401 is further configured to: if the SR and/or the BSR may be transmitted only on physical resources corresponding to one or more specific numerologies and/or TTI lengths corresponding to the bearer channel and/or logical channel, then determine corresponding numerology and/or TTI length according to the delay requirements or the quality of service (QoS) requirements corresponding to the service of triggering the SR and/or the BSR.

In some embodiments of the present disclosure, optionally, the triggering module 401 is further configured to: if the SR and/or the BSR may be transmitted only on physical resources corresponding to one or more specific numerologies and/or TTI lengths corresponding to the bearer channel and/or the logical channel, and if the terminal is out of sync in uplink on the physical resources corresponding to all the numerologies and/or TTI lengths, then initiate a random access procedure by the terminal to the network by using the physical resource corresponding to the at least one numerology and/or the TTI length to obtain uplink synchronization and UL grant; and if the UL grant may carry data, then transmit the data directly; otherwise, transmit BSR information through the UL grant.

In some embodiments of the present disclosure, optionally, the triggering module 401 is further configured to: if the SR and/or the BSR may be transmitted on the physical resource corresponding to any numerology and/or TTI length, and if the terminal is in sync in uplink on the physical resource corresponding to at least one of the numerologies and/or TTI lengths, and if the terminal has an UL grant on the physical resource corresponding to the at least one numerology and/or TTI length, then: transmit BSR information directly through the UL grant; determine by the network, according to the BSR information, information on the bearer channel/logical channel of the terminal that has uplink data to transmit; determine by the network, according to a mapping relationship between the bearer channel/logical channel and the numerology and/or the TTI length, the available numerologies and/or TTI lengths corresponding to the bearer channel/logical channel of the terminal; select by the network, the numerology and/or TTI length for data transmission from the available numerologies and/or TTI lengths; and determine the physical resource corresponding to the numerology and/or TTI length.

It is noted that if the terminal is out of sync in uplink on the physical resource corresponding to the numerology and/or TTI length selected for the data transmission, then the terminal is triggered by the triggering module to initiate a random access procedure on the physical resource corresponding to the numerology and/or TTI length to obtain uplink synchronization.

In some embodiments of the present disclosure, optionally, the triggering module 401 is further configured to:

if the SR and/or the BSR may be transmitted on the physical resource corresponding to any numerology and/or TTI length, and if the terminal does not have an UL grant on the physical resource corresponding to said any numerology and/or TTI length, then select at least one numerology and/or TTI length to initiate a random access procedure and obtain an UL grant.

It is noted that if the physical resource corresponding to the numerology and/or TTI length which obtains the UL grant may be used to carry the data of the bearer channel/logical channel of the terminal that currently has the uplink data transmission requirement, and if the UL grant may carry all the data to be transmitted, then the UL grant is used directly by the triggering module for data transmission.

It is noted that if the physical resource corresponding to the numerology and/or TTI length which obtains the UL grant may be used to carry the data of the bearer channel/logical channel of the terminal that currently has the uplink data transmission requirement, and if the UL grant may not carry all the data to be transmitted, then the UL grant is used to transmit BSR information, the network determines information on the bearer channel/logical channel of the terminal that has uplink data to transmit according to the BSR information, determines the available numerologies and/or TTI lengths corresponding to the bearer channel/logical channel of the terminal according to a mapping relationship between the bearer channel/logical channel and the numerology and/or the TTI length, selects the numerology and/or TTI length for data transmission from the available numerologies and/or TTI lengths, and determines the physical resource corresponding to the numerology and/or TTI length.

It is noted that if the physical resource corresponding to the numerology and/or TTI length selected for the data transmission is out of sync in uplink, then the terminal is triggered by the triggering module to initiate a random access procedure on the physical resource corresponding to the numerology and/or TTI length to obtain uplink synchronization.

In some embodiments of the present disclosure, optionally, the triggering module 401 is further configured to:

if the SR and/or the BSR may be transmitted on the physical resource corresponding to any numerology and/or TTI length, and if the terminal is out of sync in uplink on the physical resources corresponding to all the numerologies and/or the TTI lengths, then initiate a random access procedure to the network by using the physical resource corresponding to at least one numerology and/or the TTI length to obtain uplink synchronization and UL grant.

It is noted that if the physical resource corresponding to the numerology and/or TTI length which obtains the UL grant may be used to carry the data of the bearer channel/logical channel of the terminal that currently has the uplink data transmission requirement, and if the UL grant may carry all the data to be transmitted, then the UL grant is used directly by the triggering module for data transmission.

It is noted that if the UL grant corresponding to the numerology and/or TTI length which obtains the UL grant may not carry all the data to be transmitted, the UL grant is used to transmit the BSR information, the network determines information on the bearer channel/logical channel of the terminal that has uplink data to transmit according to the BSR information, determines the available numerologies and/or TTI lengths corresponding to the bearer channel/logical channel of the terminal according to a mapping relationship between the bearer channel/logical channel and the numerology and/or the TTI length, selects the numerology and/or TTI length for data transmission from the available numerologies and/or TTI lengths, and determines the physical resources corresponding to the available numerologies and/or TTI lengths.

It is noted that if the terminal is out of sync in uplink on the physical resource corresponding to the numerology and/or TTI length selected for the data transmission, the terminal is triggered by the triggering module to initiate a random access procedure on the physical resource corresponding to the numerology and/or TTI length to obtain uplink synchronization.

In some embodiments of the present disclosure, the fact that the SR and/or the BSR triggered by one bearer channel/logical channel of the terminal may be transmitted only on the physical resource corresponding to one or more specific numerologies and/or TTI lengths corresponding to this bearer channel/logical channel is specified by a protocol, or notified by the network side to the terminal; or the fact that the SR and/or the BSR triggered by one bearer channel/logical channel of the terminal is transmitted on the physical resource corresponding to any numerology and/or TTI length is specified by a protocol, or notified by the network side to the terminal; or whether the SR and/or the BSR triggered by one bearer channel/logical channel of the terminal may be transmitted only on the physical resource corresponding to one or more specific numerologies and/or TTI lengths corresponding to this bearer channel/logical channel or may be transmitted on the physical resource corresponding to any numerology and/or TTI length is specified by a protocol, or notified by the network side to the terminal.

In some embodiments of the present disclosure, optionally, the device further includes:

a first determining module, configured to determine, based on a cell or a cell group, whether the terminal is in sync in uplink on the physical resource corresponding to one numerology and/or one TTI length, wherein the physical resources corresponding to all the numerologies and/or the TTI lengths in one cell or one cell group have the same uplink synchronization status.

In some embodiments of the present disclosure, optionally, the first determining module determines, according to the cell or cell group in which the physical resource corresponding to the numerology and/or TTI length is located, whether the terminal is in sync in uplink on the physical resource corresponding to one numerology and/or one TTI length; and if the terminal is in sync in uplink on the cell or cell group in which the physical resource corresponding to the numerology and/or TTI length is located, then the terminal is in sync in uplink on the physical resource corresponding to the numerology and/or TTI length; otherwise, the terminal is out of sync in uplink on the physical resource corresponding to the numerology and/or TTI length.

It is noted that each cell or cell group corresponds to an uplink synchronization maintenance timer (TA timer), wherein the TA timer is started, restarted, or timed out based on the cell or the cell group, and the TA timers corresponding to different cells or cell groups are configured with the same or different lengths.

In some embodiments of the present disclosure, optionally, the device further includes:

a second determining module, configured to determine, according to the uplink synchronization status of the physical resource corresponding to the numerology and/or the TTI length, whether the terminal is synchronized on the physical resource corresponding to the numerology and/or the TTI length.

It is noted that each numerology and/or TTI length corresponds to an uplink synchronization maintenance timer (TA timer), wherein the TA timer is started, restarted, or timed out based on the numerology and/or TTI length, and the TA timers corresponding to different numerologies and/or TTI lengths are configured with the same or different lengths.

In some embodiments of the present disclosure, an SR and/or BSR process is triggered, if there is uplink data transmission requirement in a bearer channel and/or logical channel of the terminal, and there is no uplink resource available to the terminal on physical resources corresponding to numerologies and/or TTI lengths available to the bearer channel and/or the logical channel; the terminal selects SR and/or BSR to transmit resources, that is, a new SR and/or BSR triggering mechanism is introduced. In this manner, it is ensured that the terminal may perform normal uplink data transmission when multiple numerologies and/or TTI lengths coexist.

Based on the same inventive concept, a terminal is further provided in some embodiments of the present disclosure. Since the principle of solving the problem by the terminal is similar to that of the SR/BSR triggering method in FIG. 1 and described in some embodiments of the present disclosure, for the implementation of the terminal, reference may be made to the implementation of the method, and no repeated description is given herein.

In some embodiments of the present disclosure, a terminal is provided, which includes a memory, a processor, and a computer program stored in the memory and runnable on the processor, wherein the steps of the SR/BSR triggering method as described in the above embodiments are implemented when the computer program is executed by the processor.

Figure 5:
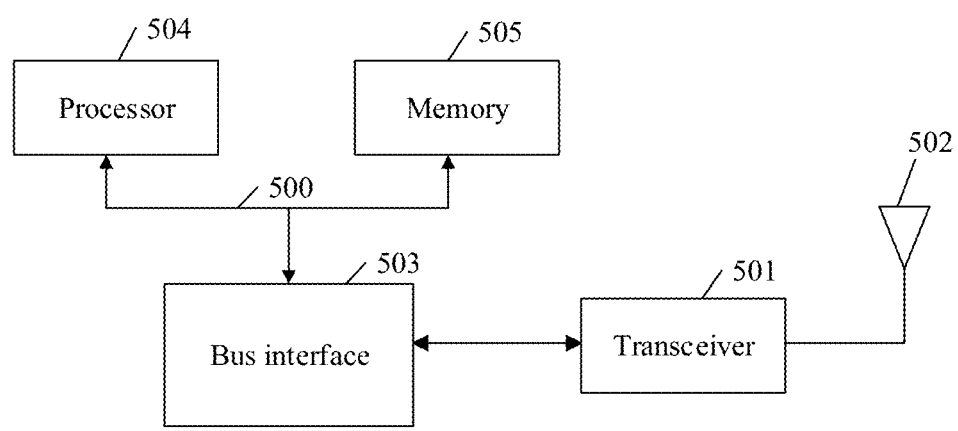
FIG. 5 is a structural block diagram of a terminal in some embodiments of the present disclosure.

Referring to FIG. 5, some embodiments of the present disclosure provide a terminal, which includes:

a processor 504, which is configured to read a program in a memory 505 and execute the following process:

triggering an SR (Scheduling Request) and/or BSR (Buffer Status Report) process, if there is uplink data transmission requirement in a bearer channel and/or logical channel of the terminal, and there is no uplink resource available to the terminal on physical resources corresponding to numerologies and/or TTI lengths available to the bearer channel and/or the logical channel; and a transceiver 501, which is configured to receive and transmit data under the control of the processor 504.

In FIG. 5, the bus architecture (represented by bus 500) may include any number of interconnected buses and bridges, and the bus 500 links one or more processors represented by the processor 504 and various circuits of the memory represented by a first memory 505 together. The bus 500 may also link various other circuits, such as peripherals, voltage regulators, and power management circuits together. These components are known in the art, and therefore will not be further described herein. A bus interface 503 provides an interface between the bus 500 and the transceiver 501. The transceiver 501 may be an element or a plurality of elements, such as a plurality of receivers and transmitters, providing units for communicating with various other devices on a transmission medium. Data processed by the processor 504 is transmitted on a wireless medium by the transceiver 501 and an antenna 502. Further, the antenna 502 also receives data and transmits the data to the processor 504 via the transceiver 501.

The processor 504 is responsible for managing the bus 500 and normal processing, and may also provide various functions, including timing, peripheral interfaces, voltage regulation, power management, and other control functions, whereas the memory 505 may be used to store data used by the processor 504 when executing operations. Specifically, the processor 504 may be a CPU, an ASIC, a FPGA, or a CPLD.

Optionally, the processor 504 is specifically configured to:

if the SR and/or the BSR may be transmitted only on physical resources corresponding to one or more specific numerologies and/or TTI lengths corresponding to the bearer channel and/or logical channel, and if the terminal is in sync in uplink on the physical resource corresponding to at least one of the numerologies and/or TTI lengths, then send SR by the terminal to a network side by using the physical resource corresponding to the at least one numerology and/or the TTI length to obtain an uplink scheduling grant (UL grant); and if the UL grant may carry data, then transmit the data directly; otherwise, transmit BSR information through the UL grant.

Optionally, the processor 504 is specifically configured to:

if the SR and/or the BSR may be transmitted only on physical resources corresponding to one or more specific numerologies and/or TTI lengths corresponding to the bearer channel and/or the logical channel, and if the terminal is out of sync in uplink on the physical resources corresponding to all the numerologies and/or TTI lengths, then initiate a random access procedure by the terminal to the network by using the physical resource corresponding to the at least one numerology and/or the TTI length to obtain uplink synchronization and UL grant; and if the UL grant may carry data, then transmit the data directly; otherwise, transmit BSR information through the UL grant.

Optionally, the processor 504 is specifically configured to:

if the SR and/or the BSR may be transmitted on the physical resource corresponding to any numerology and/or TTI length, and if the terminal is in sync in uplink on the physical resource corresponding to at least one of the numerologies and/or TTI lengths, and if the terminal has an UL grant on the physical resource corresponding to the at least one numerology and/or TTI length, then: transmit BSR information directly through the UL grant; determine by the network, according to the BSR information, information on the bearer channel/logical channel of the terminal that has uplink data to transmit; determine by the network, according to a mapping relationship between the bearer channel/logical channel and the numerology and/or the TTI length, the available numerologies and/or TTI lengths corresponding to the bearer channel/logical channel of the terminal; select by the network, the numerology and/or TTI length for data transmission from the available numerologies and/or TTI lengths; and determine the physical resource corresponding to the numerology and/or TTI length.

Optionally, the processor 504 is specifically configured to:

if the terminal is out of sync in uplink on the physical resource corresponding to the numerology and/or TTI length selected for the data transmission, then trigger the terminal to initiate a random access procedure on the physical resource corresponding to the numerology and/or TTI length to obtain uplink synchronization.

Optionally, the processor 504 is specifically configured to:

if the SR and/or the BSR may be transmitted on the physical resource corresponding to any numerology and/or TTI length, and if the terminal does not have an UL grant on the physical resource corresponding to said any numerology and/or TTI length, then select by the terminal at least one numerology and/or TTI length to initiate a random access procedure and obtain an UL grant.

Optionally, the processor 504 is specifically configured to:

if the physical resource corresponding to the numerology and/or TTI length which obtains the UL grant may be used to carry the data of the bearer channel/logical channel of the terminal that currently has the uplink data transmission requirement, and if the UL grant may carry all the data to be transmitted, then use the UL grant directly for data transmission.

Optionally, the processor 504 is specifically configured to:

if the physical resource corresponding to the numerology and/or TTI length which obtains the UL grant may be used to carry the data of the bearer channel/logical channel of the terminal that currently has the uplink data transmission requirement, and if the UL grant may not carry all the data to be transmitted, then use the UL grant to transmit BSR information, determine by the network information on the bearer channel/logical channel of the terminal that has uplink data to transmit according to the BSR information, determines by the network the available numerologies and/or TTI lengths corresponding to the bearer channel/logical channel of the terminal according to a mapping relationship between the bearer channel/logical channel and the numerology and/or the TTI length, select the numerology and/or TTI length for data transmission from the available numerologies and/or TTI lengths, and determine the physical resource corresponding to the numerology and/or TTI length.

Optionally, the processor 504 is specifically configured to:

if the physical resource corresponding to the numerology and/or TTI length selected for the data transmission is out of sync in uplink, then trigger the terminal to initiate a random access procedure on the physical resource corresponding to the numerology and/or TTI length to obtain uplink synchronization.

Optionally, the processor 504 is specifically configured to:

if the SR and/or the BSR may be transmitted on the physical resource corresponding to any numerology and/or TTI length, and if the terminal is out of sync in uplink on the physical resources corresponding to all the numerologies and/or the TTI lengths, then initiate a random access procedure by the terminal to the network by using the physical resource corresponding to at least one numerology and/or the TTI length to obtain uplink synchronization and UL grant.

Optionally, the processor 504 is specifically configured to:

if the physical resource corresponding to the numerology and/or TTI length which obtains the UL grant may be used to carry the data of the bearer channel/logical channel of the terminal that currently has the uplink data transmission requirement, and if the UL grant may carry all the data to be transmitted, then use the UL grant is directly for data transmission.

Optionally, the processor 504 is specifically configured to:

if the UL grant corresponding to the numerology and/or TTI length which obtains the UL grant may not carry all the data to be transmitted, then use the UL grant to transmit the BSR information, determine by the network information on the bearer channel/logical channel of the terminal that has uplink data to transmit according to the BSR information, determine by the network the available numerologies and/or TTI lengths corresponding to the bearer channel/logical channel of the terminal according to a mapping relationship between the bearer channel/logical channel and the numerology and/or the TTI length, select the numerology and/or TTI length for data transmission from the available numerologies and/or TTI lengths, and determine the physical resources corresponding to the available numerologies and/or TTI lengths.

Optionally, the processor 504 is specifically configured to:

if the terminal is out of sync in uplink on the physical resource corresponding to the numerology and/or TTI length selected for the data transmission, then trigger the terminal to initiate a random access procedure on the physical resource corresponding to the numerology and/or TTI length to obtain uplink synchronization.

Optionally, the fact that the SR and/or the BSR triggered by one bearer channel/logical channel of the terminal may be transmitted only on the physical resource corresponding to one or more specific numerologies and/or TTI lengths corresponding to this bearer channel/logical channel is specified by a protocol, or notified by the network side to the terminal; or the fact that the SR and/or the BSR triggered by one bearer channel/logical channel of the terminal is transmitted on the physical resource corresponding to any numerology and/or TTI length is specified by a protocol, or notified by the network side to the terminal; or whether the SR and/or the BSR triggered by one bearer channel/logical channel of the terminal may be transmitted only on the physical resource corresponding to one or more specific numerologies and/or TTI lengths corresponding to this bearer channel/logical channel or may be transmitted on the physical resource corresponding to any numerology and/or TTI length is specified by a protocol, or notified by the network side to the terminal.

Optionally, the terminal determines, based on a cell or a cell group, whether the terminal is in sync in uplink on the physical resource corresponding to one numerology and/or one TTI length, wherein the physical resources corresponding to all the numerologies and/or the TTI lengths in one cell or one cell group have the same uplink synchronization status.

Optionally, the processor 504 is specifically configured to:

determine, according to the cell or cell group in which the physical resource corresponding to the numerology and/or TTI length is located, whether the terminal is in sync in uplink on the physical resource corresponding to one numerology and/or one TTI length; and if the terminal is in sync in uplink on the cell or cell group in which the physical resource corresponding to the numerology and/or TTI length is located, then the terminal is in sync in uplink on the physical resource corresponding to the numerology and/or TTI length; otherwise, the terminal is out of sync in uplink on the physical resource corresponding to the numerology and/or TTI length.

Optionally, each cell or cell group corresponds to an uplink synchronization maintenance timer (TA timer), wherein the TA timer is started, restarted, or timed out based on the cell or the cell group, and the TA timers corresponding to different cells or cell groups are configured with the same or different lengths.

Optionally, the processor 504 is specifically configured to: determine, according to the uplink synchronization status of the physical resource corresponding to the numerology and/or the TTI length, whether the terminal is synchronized on the physical resource corresponding to the numerology and/or the TTI length.

Optionally, each numerology and/or TTI length corresponds to an uplink synchronization maintenance timer (TA timer), wherein the TA timer is started, restarted, or timed out based on the numerology and/or TTI length, and the TA timers corresponding to different numerologies and/or TTI lengths are configured with the same or different lengths.

A computer readable storage medium is provided, which has a computer program (instruction) stored thereon, wherein the steps of the SR/BSR triggering method as described in the above embodiments are implemented when the program (instruction) is executed by a processor.

It is to be understood that the phrase "one embodiment" or "an embodiment" mentioned throughout the specification means that particular features, structures or characteristics related to the embodiment are included in at least one embodiment of the present disclosure. Therefore, the phrase "in one embodiment" or "in an embodiment" appearing at various parts of the entire specification does not necessarily refer to the same embodiment. In addition, these particular features, structures, or characteristics may be combined in any suitable manner in one or more embodiments.

In various embodiments of the present disclosure, it should be understood that the magnitude of the serial numbers of the above processes does not mean the order of execution, and the order of execution of each process should be determined by its function and internal logic, and should not limit the implementation process of the embodiments of the present disclosure.

Additionally, the terms "system" and "network" are used interchangeably herein.

It should be understood that the term "and/or" as used herein is merely to describe an association relationship of associated objects, indicating that there may be three relationships. For example, A and/or B may indicate the following three situations: A exists separately, A and B exist simultaneously, and B exists separately. In addition, the character "/" as used herein generally indicates that the associated objects are of an "or" relationship.

In the embodiments provided by the present disclosure, it should be understood that "B corresponding to A" means that B is associated with A, and B may be determined according to A. However, it should also be understood that determining B according to A does not mean that B is determined only according to A; instead, B may also be determined according to A and/or other information.

In the several embodiments provided by the present disclosure, it should be understood that the disclosed method and device may be implemented in other manners. For example, the device embodiments described above are merely illustrative. For example, the division of the units is only a division in terms of logical function. In actual implementation, there may also be other division manners; for example, multiple units or components may be combined or integrated into another system, or some features may be omitted or not executed. In addition, the mutual coupling or direct coupling or communication connection as shown or discussed may be an indirect coupling or communication connection through some interfaces, devices or units, and may be in electrical, mechanical or other forms.

In addition, individual functional units in various embodiments of the present disclosure may be integrated into one processing unit, or individual units may be physically included separately, or two or more units may be integrated into one unit. The above integrated unit may be implemented in the form of hardware or in the form of a combination of hardware functional units and software functional units.

The above described integrated unit implemented in the form of software functional unit may be stored in a computer readable storage medium. The above software functional unit is stored in a storage medium and includes a plurality of instructions for enabling a computer device (which may be a personal computer, a server, or a network side device, etc.) to execute part of the steps of the transceiving method of the various embodiments of the present disclosure. The foregoing storage medium includes: a U disk, a mobile hard disk, a Read-Only Memory (ROM), a Random Access Memory (RAM), a magnetic disk or an optical disk, and various media that may store program codes thereon.

Described above are preferred embodiments of the present disclosure, and it should be noted that those skilled in the art may also make several improvements and modifications without departing from the principles of the present disclosure, which will also fall within the scope of protection of the present disclosure.

What is claimed is:

1. An SR triggering method, comprising:
    triggering an SR (Scheduling Request) process, in a case that there is uplink data transmission requirement in a bearer and/or a logical channel of a terminal, and there is no uplink resource available to the terminal on physical resources corresponding to numerologies available to the bearer and/or the logical channel triggering a corresponding BSR (Buffer Status Report) or there is no uplink resource available to the terminal on physical resources corresponding to numerologies and Transmission Time Interval (TTI) lengths available to the bearer and/or the logical channel triggering a corresponding BSR, wherein the numerologies available to the bearer and/or the logical channel or the numerologies and the TTI lengths available to the bearer and/or the logical channel are configured by a network side to the terminal, and different numerologies correspond to different subcarrier spacings in a frequency domain.

2. The method according to claim 1, wherein the triggering the SR process comprises:
in a case that a SR is capable of being transmitted only on physical resources corresponding to one or more specific numerologies corresponding to the bearer and/or the logical channel triggering the corresponding BSR or on physical resources corresponding to one or more specific numerologies and one or more specific TTI lengths corresponding to the bearer and/or the logical channel triggering the corresponding BSR, and in a case that the terminal is in sync in uplink on a physical resource corresponding to at least one of the numerologies or corresponding to at least one of the numerologies and at least one of the TTI lengths, then sending the SR by the terminal to a network side by using the physical resource corresponding to the at least one numerology or corresponding to the at least one numerology and the at least one TTI length to obtain an uplink scheduling grant (UL grant); and
in a case that the UL grant is capable of carrying data, then transmitting the data directly; otherwise, transmitting BSR information through the UL grant.

3. The method according to claim 2, wherein:
in a case that the SR is capable of being transmitted only on physical resources corresponding to one or more specific numerologies corresponding to the bearer and/or the logical channel triggering the corresponding BSR or on physical resources corresponding to one or more specific numerologies and one or more specific TTI lengths corresponding to the bearer and/or the logical channel triggering the corresponding BSR, then a corresponding numerology or a corresponding numerology and a corresponding TTI length are determined according to delay requirements or quality of service (QoS) requirements corresponding to a service of triggering the SR.

4. The method according to claim 2, wherein:
a fact that the SR triggered by one bearer/logical channel of the terminal is capable of being transmitted only on the physical resources corresponding to one or more specific numerologies corresponding to the one bearer/logical channel or one or more specific numerologies and one or more specific TTI lengths corresponding to the one bearer/logical channel is specified by a protocol, or notified by a network side to the terminal; or
a fact that the SR triggered by one bearer/logical channel of the terminal is capable of being transmitted on the physical resource corresponding to any numerology or corresponding to any numerology and any TTI length is specified by a protocol, or notified by the network side to the terminal; or
whether the SR triggered by one bearer/logical channel of the terminal is capable of being transmitted only on the physical resources corresponding to one or more specific numerologies corresponding to this bearer/logical channel or one or more specific numerologies and one or more specific TTI lengths corresponding to this bearer/logical channel or is capable of being transmitted on the physical resource corresponding to any numerology or the physical resource corresponding to any numerology and any TTI length is specified by a protocol, or notified by the network side to the terminal.

5. The method according to claim 2, wherein:
the terminal determines, based on a cell or a cell group, whether the terminal is in sync in uplink on a physical resource corresponding to one numerology or a physical resource corresponding to one numerology and one TTI length, wherein physical resources corresponding to all numerologies or corresponding to all numerologies and all TTI lengths in one cell or one cell group have same uplink synchronization status.

6. The method according to claim 5, wherein:
the terminal determines, according to the cell or cell group in which the physical resource corresponding to the numerology or the physical resource corresponding to the numerology and the TTI length is located, whether the terminal is in sync in uplink on the physical resource corresponding to one numerology or the physical resource corresponding to one numerology and one TTI length; and
in a case that the terminal is in sync in uplink on the cell or cell group in which the physical resource corresponding to the numerology or the physical resource corresponding to the numerology and the TTI length is located, then the terminal is in sync in uplink on the physical resource corresponding to the numerology or the physical resource corresponding to the numerology and the TTI length; otherwise, the terminal is out of sync in uplink on the physical resource corresponding to the numerology or the physical resource corresponding to the numerology and the TTI length.

7. The method according to claim 5, wherein:
each cell or cell group corresponds to a Time Alignment (TA) timer for uplink synchronization maintenance, wherein starting, restarting or timing-out of the TA timer is maintained based on the cell or the cell group, and TA timers corresponding to different cells or cell groups are configured with a same length or different lengths.

8. The method according to claim 2, further comprising:
determining by the terminal, according to a uplink synchronization status of the physical resource corresponding to the numerology or the physical resource corresponding to the numerology and the TTI length, whether the terminal is in sync on the physical resource corresponding to the numerology or the physical resource corresponding to the numerology and the TTI length.

9. The method according to claim 1, wherein the triggering the SR process comprises:
in a case that a SR is capable of being transmitted only on physical resources corresponding to one or more specific numerologies corresponding to the bearer and/or the logical channel triggering the corresponding BSR or on physical resources corresponding to one or more specific numerologies and one or more specific TTI lengths corresponding to the bearer and/or the logical channel triggering the corresponding BSR, and in a case that the terminal is out of sync in uplink on all physical resources corresponding to the numerologies or corresponding to the numerologies and the TTI lengths, then initiating a random access procedure by the terminal to a network by using a physical resource corresponding to at least one numerology or corresponding to at least one numerology and at least one TTI length to obtain uplink synchronization and a uplink scheduling grant (UL grant); and in a case that the UL grant is capable of carrying data, then transmitting the data directly; otherwise, transmitting BSR information through the UL grant.

10. The method according to claim 1, wherein the triggering the SR process comprises:

in a case that the SR is capable of being transmitted on a physical resource corresponding to any numerology or corresponding to any numerology and any TTI length, and in a case that the terminal is in sync in uplink on a physical resource corresponding to at least one of the numerologies or corresponding to at least one of the numerologies and the TTI lengths, and in a case that the terminal has an uplink scheduling grant (UL grant) on the physical resource corresponding to at least one numerology or corresponding to at least one numerology and at least one TTI length, then: transmitting BSR information directly through the UL grant; determining by a network, according to the BSR information, information on the bearer/the logical channel of the terminal that has uplink data to be transmitted; determining by the network, according to a mapping relationship between the bearer/logical channel and the numerologies or between the bearer/logical channel and the numerologies and the TTI lengths, available numerologies corresponding to the bearer/the logical channel of the terminal or available numerologies and available TTI lengths corresponding to the bearer/the logical channel of the terminal; selecting by the network, a numerology for data transmission or a numerology and a TTI length for data transmission from the available numerologies or the available numerologies and available TTI lengths; and determining a physical resource corresponding to the numerology or corresponding to the numerology and the TTI length.

11. The method according to claim 10, wherein:

in a case that the terminal is out of sync in uplink on the physical resource corresponding to the numerology selected for the data transmission or the numerology and the TTI length selected for the data transmission, then the terminal is triggered to initiate a random access procedure on the physical resource corresponding to the numerology or corresponding to the numerology and the TTI length to obtain uplink synchronization.

12. The method according to claim 1, wherein the triggering the SR process comprises:

in a case that the SR is capable of being transmitted on the physical resource corresponding to any numerology or and numerology and any TTI length, and in a case that the terminal does not have an UL grant on the physical resource corresponding to the any numerology or corresponding to the any numerology and the any TTI length, then selecting by the terminal at least one numerology or at least one numerology and at least one TTI length to initiate a random access procedure and obtain an uplink scheduling grant (UL grant).

13. The method according to claim 12, wherein:

in a case that a physical resource corresponding to the numerology which obtains the UL grant or a physical resource corresponding to the numerology and the TTI length which obtain the UL grant is capable of being used to carry data of the bearer/the logical channel of the terminal that currently has the uplink data transmission requirement, and in a case that the UL grant is capable of carrying all data to be transmitted, then the UL grant is used directly for data transmission.

14. The method according to claim 12, wherein:

in a case that a physical resource corresponding to the numerology which obtains the UL grant or a physical resource corresponding to the numerology and the TTI length which obtains the UL grant is capable of being used to carry the data of the bearer/the logical channel of the terminal that currently has the uplink data transmission requirement, and in a case that the UL grant is incapable of carrying all data to be transmitted, then the UL grant is used to transmit BSR information, the network determines, according to the BSR information, information on the bearer/the logical channel of the terminal that has uplink data to be transmitted, determines available numerologies corresponding to the bearer/the logical channel of the terminal or numerologies and TTI lengths corresponding to the bearer/the logical channel of the terminal according to a mapping relationship between the bearer/the logical channel and the numerologies or between the bearer/the logical channel and the numerologies and the TTI lengths, selects the numerology for data transmission or the numerology and the TTI length for data transmission from the available numerologies or from the available numerologies and the TTI lengths, and determines a physical resource corresponding to the numerology or a physical resource corresponding to the numerology and the TTI length.

15. The method according to claim 12, wherein:

in a case that a physical resource corresponding to the numerology selected for the data transmission or a physical resource corresponding to the numerology and the TTI length selected for the data transmission is out of sync in uplink, then the terminal is triggered to initiate a random access procedure on the physical resource corresponding to the numerology or the physical resource corresponding to the numerology and the TTI length to obtain uplink synchronization.

16. The method according to claim 1, wherein the triggering the SR process comprises:

in a case that the SR is capable of being transmitted on a physical resource corresponding to any numerology or any numerology and any TTI length, and in a case that the terminal is out of sync in uplink on physical resources corresponding to all numerologies or corresponding to all numerologies and all TTI lengths, then initiating a random access procedure by the terminal to the network by using the physical resource corresponding to at least one numerology or corresponding to at least one numerology and at least one TTI length to obtain uplink synchronization and uplink scheduling grant (UL grant).

17. The method according to claim 16, wherein:

in a case that the physical resource corresponding to the numerology which obtains the UL grant or the physical resource corresponding to the numerology and the TTI length which obtains the UL grant is capable of being used to carry data of the bearer/logical channel of the terminal that currently has a uplink data transmission requirement, and in a case that the UL grant is capable of carrying all data to be transmitted, then the UL grant is used directly for data transmission.

18. The method according to claim 16, wherein:

in a case that the UL grant corresponding to the numerology which obtains the UL grant or the UL grant corresponding to the numerology and the TTI length which obtains the UL grant is incapable of carrying all data to be transmitted, then the UL grant is used to transmit BSR information, the network determines, according to the BSR information, information on the bearer/logical channel of the terminal that has uplink data to be transmitted, determines available numerologies corresponding to the bearer/logical channel of the terminal or available numerologies and available TTI lengths corresponding to the bearer/logical channel of the terminal according to a mapping relationship between the bearer/logical channel and the numerologies or between the bearer/logical channel and the numerologies and the TTI lengths, selects a numerology for data transmission or a numerology and a TTI length for data transmission from the available numerologies or the available numerologies and the available TTI lengths, and determines the physical resources corresponding to the available numerologies or corresponding to the available numerologies and the available TTI lengths.

19. The method according to claim 18, wherein:
in a case that the terminal is out of sync in uplink on the physical resource corresponding to the numerology selected for the data transmission or the physical resource corresponding to the numerology and the TTI length selected for the data transmission, then the terminal is triggered to initiate a random access procedure on the physical resource corresponding to the numerology or the physical resource corresponding to the numerology and the TTI length to obtain uplink synchronization.

20. A terminal, comprising:
a storage, a processor, and a computer program stored in the storage and executable by the processor, wherein when the computer program is executed by the processor, the processor implements the steps of the method of triggering the SR according to claim 1.

* * * * *

UNITED STATES PATENT AND TRADEMARK OFFICE
CERTIFICATE OF CORRECTION

PATENT NO. : 11,291,037 B2
APPLICATION NO. : 16/475674
DATED : March 29, 2022
INVENTOR(S) : Yali Zhao, Fangli Xu and Li Chen It is certified that error appears in the above-identified patent and that said Letters Patent is hereby corrected as shown below:

On the Title Page

Item (30):
"Jan. 4, 2017 (CN) ...............................20170004262.9
Mar. 13, 2017 (CN) ............................... 201710145548.9"

Is changed to:
--Jan. 4, 2017 (CN) ............................... 201710004262.9
Mar. 13, 2017 (CN) ............................... 201710145548.9--

Signed and Sealed this
Thirteenth Day of September, 2022

Katherine Kelly Vidal
*Director of the United States Patent and Trademark Office*